US012419452B1

(12) United States Patent
Johnson

(10) Patent No.: US 12,419,452 B1
(45) Date of Patent: Sep. 23, 2025

(54) SECURE FOOD DELIVERY CONTAINER

(71) Applicant: Jamie Johnson, Slidell, LA (US)

(72) Inventor: Jamie Johnson, Slidell, LA (US)

( * ) Notice: Subject to any disclaimer, the term of this patent is extended or adjusted under 35 U.S.C. 154(b) by 65 days.

(21) Appl. No.: 18/529,349

(22) Filed: Dec. 5, 2023

(51) Int. Cl.
*A47J 47/14* (2006.01)
*A47G 29/14* (2006.01)
*G07C 9/00* (2020.01)

(52) U.S. Cl.
CPC ....... *A47G 29/141* (2013.01); *G07C 9/00896* (2013.01); *A47G 2029/142* (2013.01); *A47G 2029/144* (2013.01); *G07C 2009/0092* (2013.01)

(58) Field of Classification Search
CPC ............ A47G 29/141; A47G 2029/142; A47G 2029/144; G07C 9/00896; G07C 2009/0092
See application file for complete search history.

(56) References Cited

U.S. PATENT DOCUMENTS 10,321,780 B1 * 6/2019 James .................. A47G 29/141
11,369,222 B2 6/2022 Kennett
11,666,168 B2 6/2023 Christopher
2017/0127868 A1 * 5/2017 Adewuyi ............... A47G 29/22
2019/0246828 A1 * 8/2019 Miller .................. A47G 29/124
2019/0256119 A1 * 8/2019 Brilhante ................ B62B 3/003
2022/0259891 A1 * 8/2022 Williams ............ A47J 41/0072
2022/0408973 A1 * 12/2022 Pierre ................... A47J 41/005
2023/0091818 A1 * 3/2023 Christopher ......... A47G 29/141 340/5.54
2024/0000271 A1 * 1/2024 Smith .................. G06Q 10/083

FOREIGN PATENT DOCUMENTS

WO WO-2015160632 A1 * 10/2015 ......... A47G 29/1225

* cited by examiner

*Primary Examiner* — An T Nguyen
(74) *Attorney, Agent, or Firm* — Sanchelima & Associates, P.A.; Jesus Sanchelima; Christian Sanchelima

(57) ABSTRACT

A secure food delivery container including a container assembly, a locking assembly and a hook assembly. The container assembly includes a rectangular insulated container with a hingedly attached lid. The hingedly attached lid is configured to close the container. The locking assembly includes a locking mechanism. The hook assembly includes a hook member. The hook member protrudes upward from the container. The hook member is operated to hang the container from the top of a door. The locking mechanism is configured to lock the lid with the container in a closed configuration.

1 Claim, 4 Drawing Sheets

SECURE FOOD DELIVERY CONTAINER

BACKGROUND OF THE INVENTION

1. Field of the Invention

The present invention relates to a secure food delivery container and, more particularly, to a secure food delivery container that allows securing the food for delivery after the food is placed within the container.

2. Description of the Related Art

Several designs for food containers have been designed in the past. None of them, however, include a self-locking mechanism to lock the container after placing the food therein.

Applicant believes that a related reference corresponds to U.S. Pat. No. 11,666,168 issued for an insulated food delivery container with electronic locks. Applicant believes that another related reference corresponds to U.S. Pat. No. 11,369,222 issued for a secure package delivery container with an electronic door lock. None of these references, however, teach of a secure food delivery container that is comprised of a rectangular insulated container with a hinged locking lid mechanism and a pair of hook members which allows the container to be securely hung from the top of a door such that the container is accessible to food delivery personnel.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a secure food delivery container that includes hook members to hang the container in a door so it can be taken by delivery personnel and/or customers, preventing non desired people to touch the food therein.

It is another object of this invention to provide a secure food delivery container that includes a note box so it can be read for delivery personnel.

It is still another object of the present invention to provide a secure food delivery container that includes a locking mechanism with key lock or key lock pad to access the food within the container.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
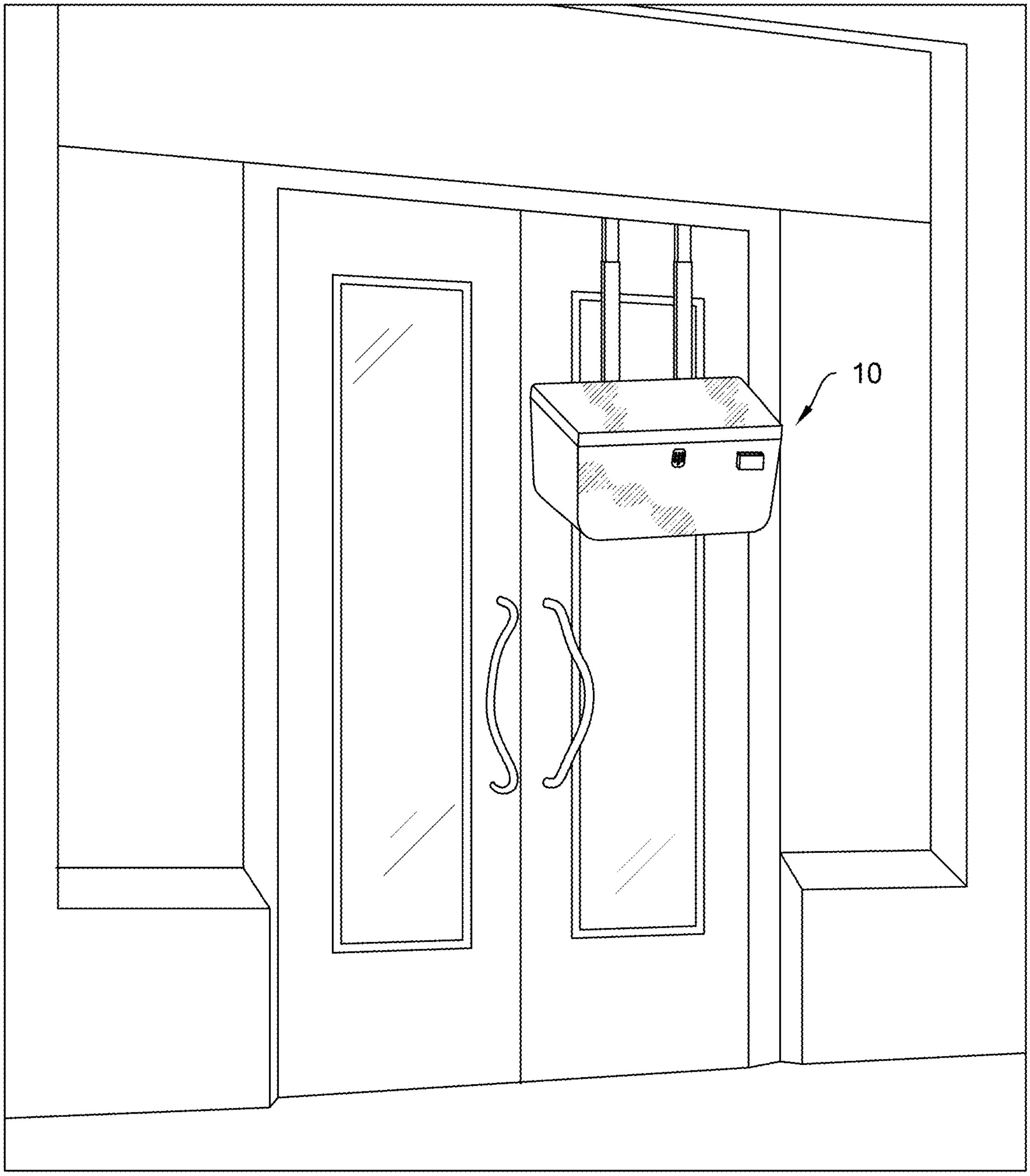
FIG. 1 represents an isometric operational view of the present invention 10.

Referring now to the drawings, where the present invention is generally referred to with numeral 10, it can be observed that it basically includes a container assembly 20, a locking assembly 40 and a hook assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 4:
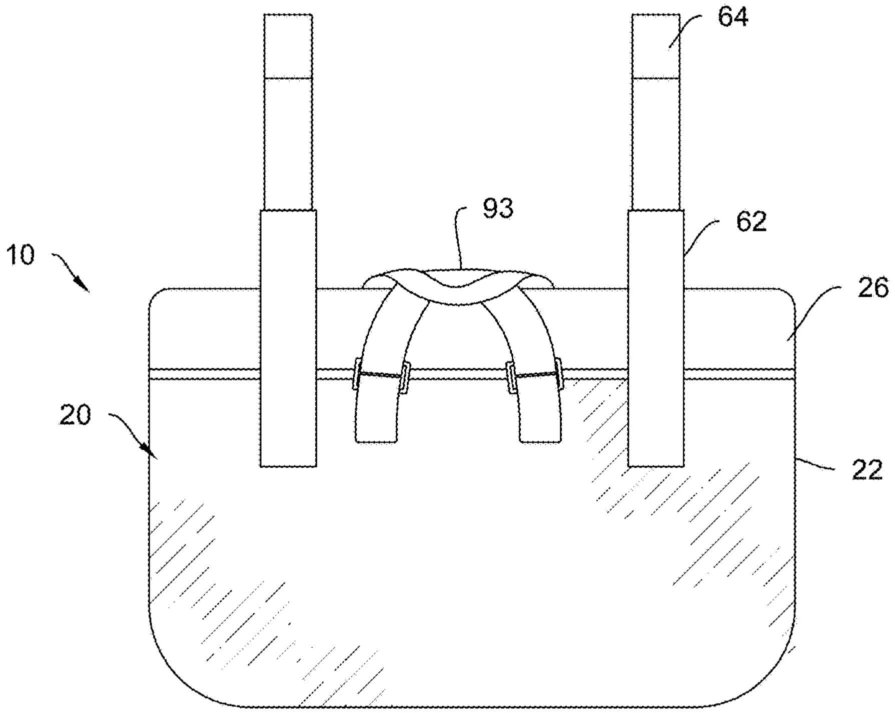
FIG. 4 shows a rear side view of the present invention 10.

The container assembly 20 may include a container 22, a lid 26, inner walls 24, straps 17, receiving member 12, protruding members 11, a pocket 21 and inner walls 24. The container 22 may substantially have a rectangular shape. It also may be suitable for the container 22 to have a cylindrical shape, a triangular shape, or any other suitable shape. The container 22 may be made of polyurethane, polyvinyl chloride, or any other suitable material. The container 22 may be hollow. The container 22 may have a bottom wall, a right wall, a left wall, a front wall and a rear wall. The inner walls 24 may include insulation such as rubber plastic. The walls of container 22 may be filled out with polystyrene, fiberglass, or any other insulating material. The pocket 21 may be located on a front wall of the container 22. The pocket 21 may be hollow. The pocket 21 may be adapted to receive paper notes therein. The pocket 21 may have a rectangular shape. The pocket 21 may be made of plastic, metal, or any other suitable material. It also may be suitable for the pocket 21 to be located on a rear wall, left wall, or have any other configuration in the container 22. The container 22 may include a handle 93, as best illustrated in FIG. 4. The handle 93 may be made of plastic. The handle 93 may be preferably be pivotally attached to a rear wall of container 22.

The container 22 may include elastic straps 17 placed on inner walls thereof. In a preferred embodiment the container 22 may be placed on a left inner wall and right inner wall of the container 22. The container 22 may have rounded corners.

Figure 2:
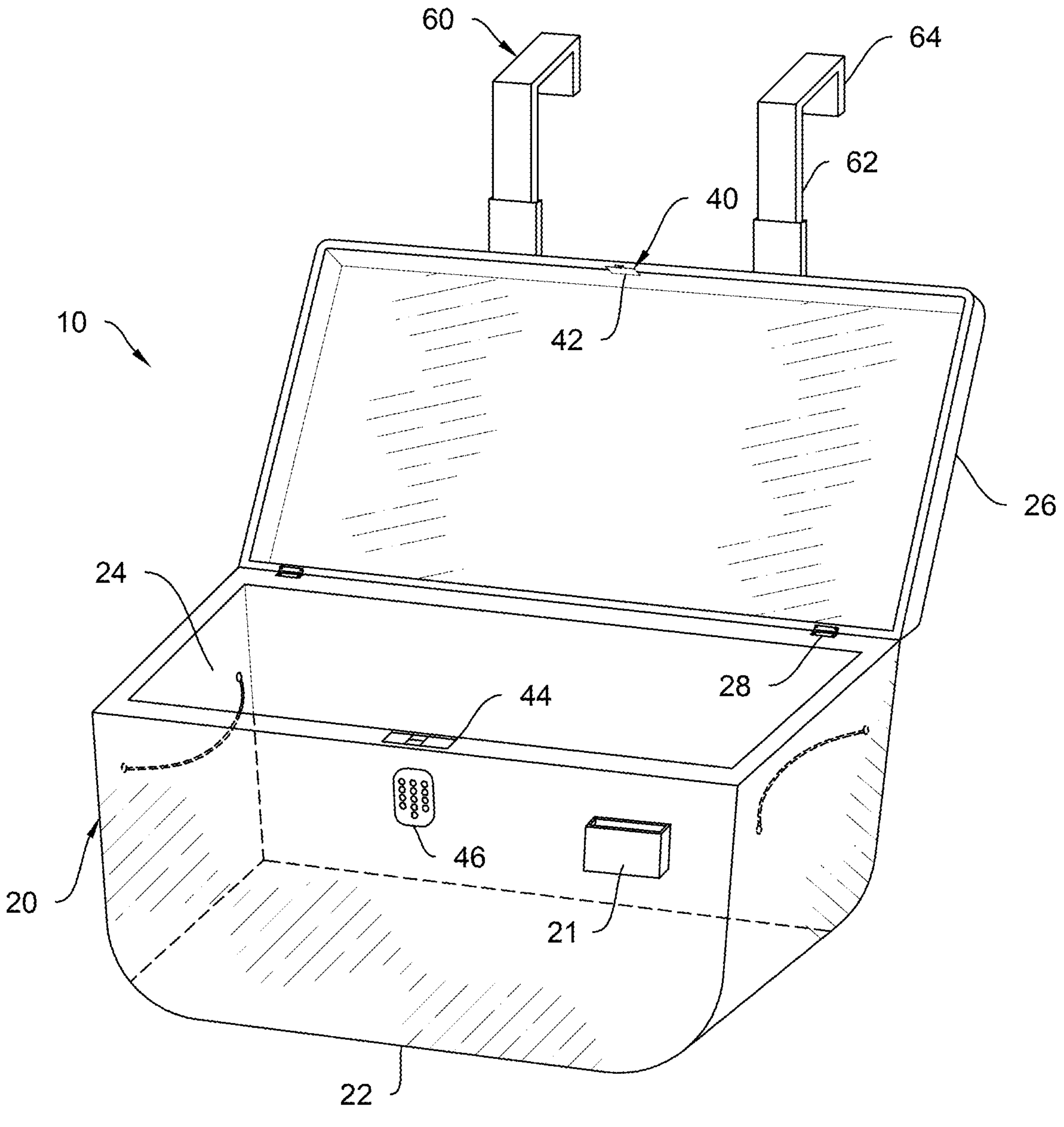
FIG. 2 shows an isometric view of the present invention 10 in an open configuration. The present invention 10 includes a container assembly 20, a locking assembly 40 and a hook assembly 60.
Figure 2A:
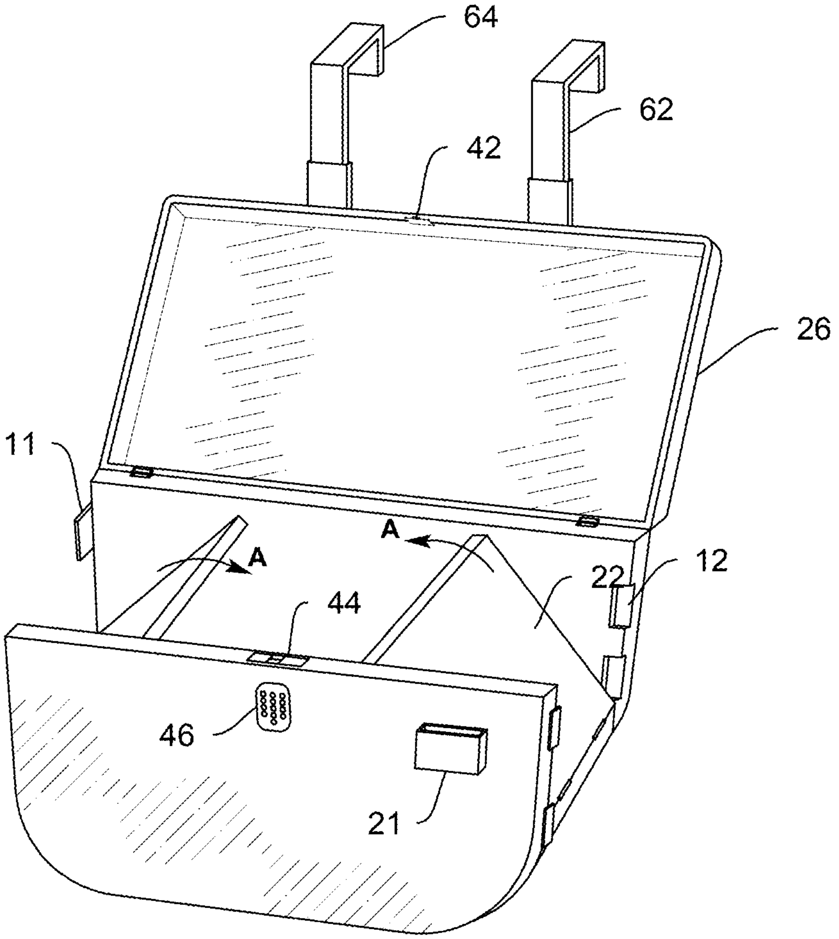
FIG. 2A depicts an exploded view of the present invention 10.

The lid 26 may have a rectangular shape. The lid 26 may have a top wall, a right wall, a left wall, a rear wall and a front wall. The lid 26 may be hingedly attached to a top portion of the rear wall of the container 22 through hinges 28. The lid 26 may be made of polyurethane, polyvinyl chloride, or any other suitable material. The sidewalls of the lid 26 may be flush with the sidewalls of the container 22. As best illustrated in FIG. 2A, the present invention is made of a plurality of rectangular plates in the form of walls of the present invention 10. Each of the walls of the present invention 10 may include a locking portion 11 and a receiving portion 12. Locking portions 11 may be inserted into the receiving portion 12 to lock the walls in a predetermined position. The locking portions 11 may get locked through operating a keypad 46. The container 22 may be disassembled for easy carrying.

As best illustrated in FIG. 2A the container 22 may have each of the walls thereof detachable therebetween. In a preferred embodiment walls of the container 22 may be connected through the receiving members 12 and the protruding members 11 which may be coupled together and secured therebetween. The container 22 may be collapsible in such a way that lateral walls collapse to a central portion of the container 22. In order to separate the walls of the container 22 the present invention 10 may be unlocked by the locking assembly 40. The container 22 may include a movable head 93 on a rear portion thereof.

The locking assembly 40 may include a lock member 42, a receiving member 44, and the keypad 46. The lock member 42 may protrude downwardly from a central edge of the front wall of the lid 26. The lock member 42 may preferably be made of metal. The lock member 42 may have a curved portion to engage within the receiving member 44. It also may be suitable for the lock member 42 to be made of plastic, or any other suitable material. The receiving member 42 may include an opening formed in a front wall of the container 22. The receiving member 42 may include a locking mechanism. The locking mechanism may be operatively connected to the keypad 46. The lock member 42 may be inserted into the receiving member 44 when closed over the top of the container. The Keypad 46 may be operated to lock or unlock the lock member 42 within the receiving member 44.

Figure 3:
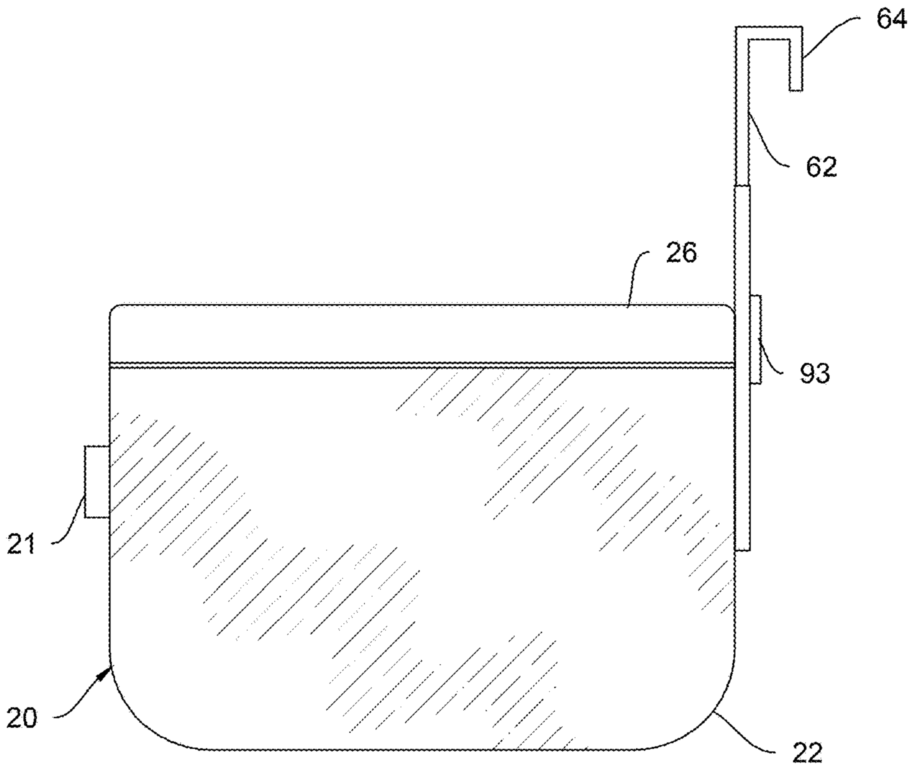
FIG. 3 illustrates a side view of the present invention 10 in a closed configuration.

The hook assembly 60 may include hook member 62 having a bent portion 64. The hook member 62 may preferably be made of stainless steel. It also may be suitable for the hook member 62 may be made of polyurethane, iron, or any other suitable material. As best illustrated in FIG. 3, the hook member 62 may be attached to the rear wall of the container 22. The hook member 62 may protrude upwardly from the rear wall of the container 22. The bent portion 64 may include an inverted L-shaped member protruding from the top portion of the hook member 62. The hook member 62 may be telescopical, as best illustrated in FIG. 2. The hook member 62 may be telescopic.

In a preferred embodiment the container 22 may store food therein. In some embodiments the container 22 may include temperature sensors, weight sensors, or any other sensor to detect food therein. The container 22 may automatically lock when detecting food therein. Predetermined passwords may be generated so the container 22 can be opened. In a preferred embodiment a food service prepares food, introduce the food into the container 22, the container locks, the container is hung so it can be taken by a food deliveryman and only the final customer would be provided with the password to unlock the container 22.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A secure food delivery container, consisting of:

a container assembly, wherein said container assembly includes a rectangular insulated container with a hingedly attached lid, said hingedly attached lid is configured to close said container, wherein said container includes a pocket attached to a front wall of the container, wherein said container is filled with an insulating material;

a locking assembly, wherein said locking assembly includes a locking mechanism, said locking mechanism is configured to lock said lid with said container in a closed configuration, wherein said locking mechanism includes a keypad, said keypad is operated to lock or unlock the locking mechanism;

and a hook assembly, wherein said hook assembly includes two hook members protruding upward from said container, wherein each hook member is operated to hang said container from the top of a door, wherein each hook member is made of a metallic rectangular planar member, wherein said hook members are equidistantly spaced from each other, wherein each hook member includes a front portion extending upward from a rear wall of the container and a bent portion in the form of an inverted L-shaped member protruding from the top of the front portion.

* * * * *